United States Patent Office 2,873,493
Patented Feb. 17, 1959

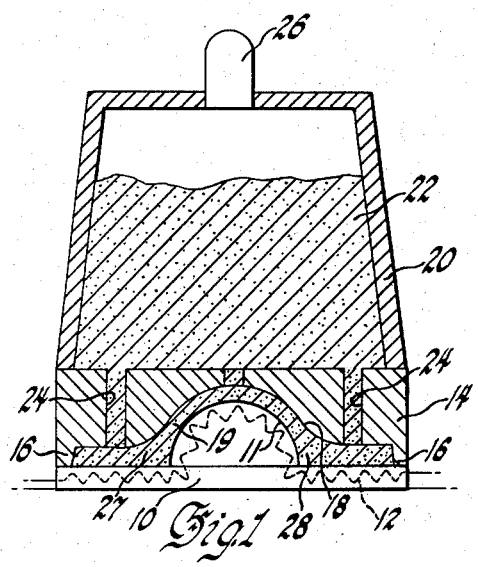
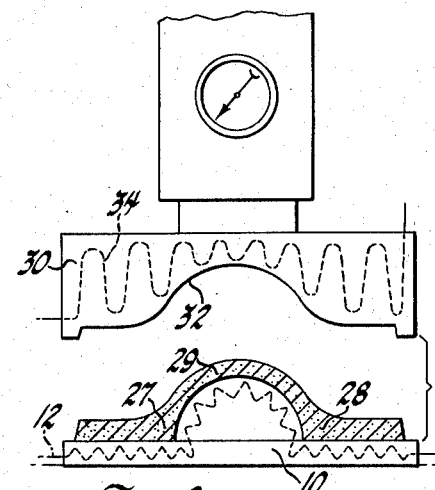
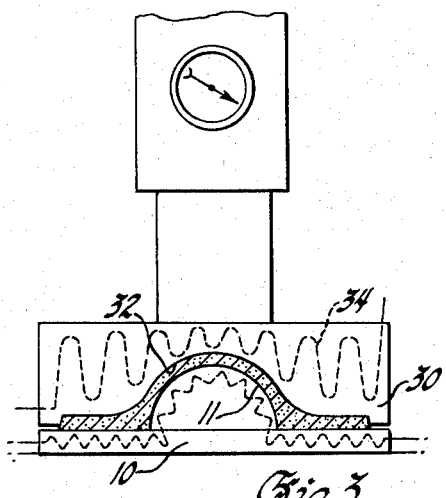
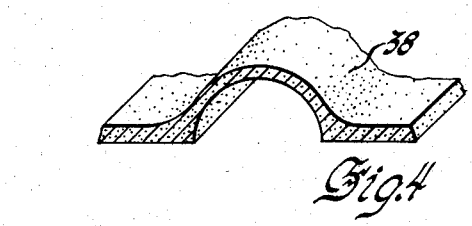
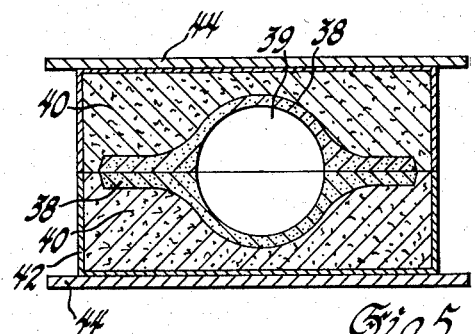

2,873,493

SHELL MOLDING

Robert F. Thomson, Grosse Pointe Woods, Raymond S. Amala, Oak Park, and Charles M. Eberhardt, Berkley, Mich., assignors to General Motors Corporation, Detroit, Mich., a corporation of Delaware Application February 18, 1954, Serial No. 411,062

3 Claims. (Cl. 22—193)

This invention relates to improvements in shell molding.

Recently developed techniques in foundry practice incorporate the use of thin-walled dispensible molds and cores composed of sand and thermosetting binders. These procedures, generally referred to as "shell molding", processes, are particularly suitable for the production of precision castings in a wide variety of metals.

Essentially the shell molding process consists in using a thermosetting plastic or resin as a binder for the grains of sand and/or other suitable refractory material to form rigid molds having high gas permeability, good surface smoothness and dimensional stability. The molding material, which is generally a dry mixture of a major portion of silica or other refractory oxide sand and a minor proportion of a plastic binder is used in powdered form with no water being added. Phenol formaldehyde and melamine formaldehyde resins are typical examples of the type of thermosetting binders preferably used. It is desirable that the sand employed be free of clay, moisture and organic matter. Silica flour or other finely comminuted refractory facing materials may also be included in the molding mix to provide the mold with an exceptionally smooth surface.

These shell or sand resin molds are prepared by allowing the dry mixture of sand and resin to come into contact with a hot pattern for a short period of time. A layer of the mix adheres to the pattern surface due to the heating of the resin which bonds the sand with which it is intimately mixed thereby accurately producing pattern details. The half patterns, gates and runners are usually permanently fixed on metal plates. Metal patterns normally must be used because they are subjected to elevated temperatures. Pattern temperatures of 350° F. to 500° F. are preferred but under particular conditions temperatures ranging as low as 250° F. or lower and temperatures up to 700° F. or even higher may be advantageously employed. The pattern temperature, the characteristics of the resin, the sand and the length of time the molding material is allowed to remain in contact with the hot pattern surface determine the resulting thickness of the mold. Mold build-up times ranging from a few seconds to approximately 1 minute are appropriate for various applications. After the short time interval the excess dry sand and resin are removed and the closely adhering sand-resin layer is preferably cured while in contact with the pattern by means of subjecting the same to heat within the range of approximately 300° F. to 1500° F. The curing or baking time is relatively short, usually from a few seconds to five minutes. This baking operation results in the conversion of the resinous material to a hard, insoluble binder which securely bonds the sand grains together. The formed molds are, in effect, thin shells which have sufficient strength and stiffness to make them suitable for many casting operations. After curing of the mold, it is stripped from the pattern.

The cost of the resin or binder is a limiting factor on the shell molding process. Current production practice uses relatively thick shells (5/16" to 1/2" thick) and phenol formaldehyde or other thermal setting resins in amounts from 4% to 11% binder by weight. Attempts to use thinner shell molds or to employ lower resin contents to pour metal castings, such as, for example, iron, steel, bronze, etc., without supporting material may cause the shell to crack and the metal to run out of the mold or produce cracks in the mold which will produce fins on the casting. Mold warpage may produce castings requiring greater dimensional tolerances.

Among the objects of the present invention are one or more of the following, singly or in combination: (1) to provide an improved method of forming thin shell molds in which the amount of heat-hardenable or thermosetting resinous binder is greatly reduced, without decreasing the strength of the mold, (2) to provide an improved method and means of backing up shell molds wherein thin shells may be used having low binder content, (3) to provide an inexpensive, easily made, refractory back-up means which can be reused in backing up a multiplicity of shell molds whereby a multiplicity of metal castings can be made by a single back-up, (4) to provide an inexpensive, easily made, reusable, refractory back-up means which permits thin shells of low resin content to be used in formation of metal castings within close dimensional limits. Other objects and advantages of the invention will become more apparent as the description proceeds.

In accordance with a preferred embodiment of the present invention a thin shell mold having a low resin content is backed-up by an inexpensive, refractory material accurately formed to conform to the back of the shell mold. The refractory back-up material is easily made and is reusable in backing up a multiplicity of shell molds.

The thin shell molds of low resin content may be made in any suitable manner. A preferred method is to apply a layer of sand and/or other suitable refractory material and resin to a heated pattern and then compact the layer of sand and resin which adheres to the metal pattern. It is preferred to apply heat and pressure simultaneously to the back of the shell adhering to the heated pattern. This not only compacts the sand and resin making up the shell whereby it is reduced in thickness but also results in a rapid cure and permits the use of a lower temperature cure head due to better heat transmission. As a result a strong shell mold is produced so that a much smaller amount of the resin is permissible. While satisfactory shell molds have been made with as low as 1% of resin with relatively coarse sand, very satisfactory results are obtained when approximately 2% to 3½% of the resin is employed, when the sand and/or other refractory is of the sizes normally employed in conventional shell molding procedures where smooth casting surface and accurate detail are required.

The degree of pressure employed is dependent on a number of factors including the temperature employed, amount of resin and the degree of permeability necessary in the final shell mold. It is presently preferred to employ pressures of about 300 to 1200 lbs. per square inch on the back of the shell mold adhering to the heated pattern plate. However, pressures as low as 25 to 50 lbs. per square inch have been employed, as have pressures of 2000 lbs. per square inch and above. It is presently preferred that the pressure applied to the shell or layer adhering to the metal pattern should be sufficient to reduce the thickness of the shell about 20% to 25%. It is preferred that the time of application of the pressure and heat should be no longer than necessary to complete the cure of the resin. In general the time of cure will not need to be more than about 15 to 20 seconds but may in some cases require 30 seconds or 1 minute.

The preferred method of applying the pressure is by means of an accurately contoured die. If desired the dimensions of the pressure or squeeze-die may be such as to produce more squeezing or compacting on preferred parts of the mold shell, thus producing greater strength in these areas. Preferred die temperatures range from about 350°–900° F., but under some conditions temperatures as low as 300° F. and as high as 1500° F. may be used.

While it is greatly preferred that heat be applied to the pressure means, so that heat and pressure are applied simultaneously to the shell adhering to the pattern, it is within the scope of the invention in its broader aspects that the pressure means may have no external heat applied thereto. In such instances, after pressing the shell adhering to the heated pattern, the pattern and adhering shell are heated and cured in an oven or furnace as in conventional shell molding procedures and at oven temperatures within the range of 300° F. to 1500° F.

While it is presently preferred that the layer of sand and resin adhering to the heated metal pattern be compacted by the heated contoured die, it is contemplated in some cases that no pressure, or only sufficient pressure to give good heat conduction between the die and the layer of sand and resin adhering to the heated metal pattern, be employed. All that is necessary to the invention in its broader aspects is that the final thin shell have an accurately contoured back and have sufficient strength to enable handling and incorporation in the back-up.

The refractory material and resin may be the same as those employed in conventional shell molding operations. Any heat hardenable or thermosetting resin may be employed. Typical examples of thermosetting resins are phenol formaldehyde and melamine formaldehyde resins. The refractory material generally consists largely of silica or other refractory oxide sand. It is desirable that this sand be free of clay, moisture and organic matter as these decrease the strength that can be obtained with an amount of resin binder. While the process is satisfactorily carried out by employing coated, partially coated, or non-coated sands, and with either "blown" or "dumped" shells, it is preferred at present to produce blown shells and to employ resin coated sand particles. This may be accomplished by either hot or cold mixing. One satisfactory hot method consists of applying a liquid novolak phenol formaldehyde resin to silica sand (fineness is varied depending upon surface finish required in the casting) previously heated to 300° F. in a mixing vessel such as a muller. Mixing is continued until the volatile materials have been removed and the temperature of the sand drops below 180° F. at which time conventional curing agents are added in the amounts of about 20% of the resin content. Small amounts of the curing agents may be added before the sand drops to 180° F. Mixing is further continued until the curing agents are uniformly dispersed. The sand is now ready for making shells.

One suitable cold or room temperature method of making a coated sand comprises mulling silica sand at room temperature with a mixture of volatile organic solvents such as methanol, ethanol, methyl ethyl ketone, etc., and phenol formaldehyde resin until volatiles have been removed and the sand is in a friable condition. The sand is ready for use.

In a second cold or room temperature method the sand is intimately mixed with a liquid novolak (phenol formaldehyde) until the solvents have been removed at which time any suitable curing agent is added. Mulling is continued until intimate mixing occurs at which time the sand is ready for use.

A suitable method of making a "partially" coated sand is to intimately mix at room temperature a small amount of liquid resin (e. g. $\frac{1}{16}$–$\frac{1}{2}$% by weight of phenol formaldehyde, furfural, or other equivalent resinous materials), after which the dry powdered resin is added and mulled until uniformly mixed at which time the mixture is dry. The sand is now ready for use.

While, as pointed out above, it is presently preferred to form the shells by blowing, they may also be formed by the "dump" or "roll-over" process or otherwise.

After the shell molds have been made they are ready for "backing." The backing is made of refractory material that accurately conforms to the shape of the back of the shell mold. A suitable pattern for making the refractory back-up may be made by making a shell mold made on the contoured die or press head and applying a suitable water resistant coating such as shellac, varnish, etc., to the back of the shell. A second and preferred method of making a pattern for the back-up is to cast a non-shrinking material, metallic or non-metallic, such as type metal, cast plactics, cold formed rubber, or equivalent into the impression of the contoured die or press head. The most desirable characteristics of this pattern material are moderate strength to permit the production of more than one cast back-up, resistance to deformation due to weight of cast refractory or externally applied pressure after casting the refractory. The pattern material is then stripped from the press head and is ready for use after suitable curing cycles.

The pattern which conforms to the contour of the back of the shell mold is then used to form the refractory back-up. A preferred method of forming the back-up is to form a slurry consisting of refractory cement and grog and apply this to the pattern. A typical slurry is made by mixing, at room temperatures, a mixture of ten parts castable refractory composed essentially of calcium aluminate cement and grog consisting of refractory oxides such as silica, alumina and magnesia, and two parts water. This is mixed to a uniform consistency either manually or mechanically.

The previously prepared pattern is suitably mounted and a retainer is placed around the pattern. This retainer may be a simple sheet metal frame. The refractory slurry is cast onto the pattern and leveled at the edges of the retainer by simply striking off the back side of the cast refractory. The leveled surface is made smooth by a process such as trowelling, pressing or other satisfactory methods for producing a smooth flat back in the cast refractory.

A preferred method is to conduct the above operations using a retainer of accurate dimension and satisfactory draft to permit withdrawing the refractory either before or after curing and inserting said refractory into matching frames mounted on the device for holding the shell mold.

The cast refractory material is then suitably cured to produce a dry rigid mass. The refractory previously described is cured by air drying for a suitable period (e. g. 24 hours at room temperature followed by a 400° F. treatment for two hours). It may be desirable to cure for a short time (e. g., 6–8 hours) at an elevated temperature (e. g., 300° F.) to hasten and insure evaporation of uncombined water. The back-up is now ready for use.

While it is currently preferred to make the refractory back-ups by casting or pouring a slurry consisting of refractory cement, refractory oxides and water onto the pattern, the back-ups may be made by other procedures, such as, for example, ramming or otherwise applying the wet or damp refractory mix to the pattern. Any conventional or suitable castable refractory may be employed in making the back-ups. Various castable refractories are available commercially. Typical examples are Harbison and Walker High-Strength Castable Refractory, and Zero Hearth and Baffle Cement. These materials may be simply mixed with water and applied to the pattern.

These castable refractories may be cured by a setting for 24 hours followed by air drying at say 400° F. for two to four hours. Other materials which may be employed for the back-ups are sodium silicate bonded Flint shot sand or mixtures of Flint shot, crystal and bonding sands, bonded by sodium silicate. Another material is a mixture of Clarion fireclay and "Cast set" (A. P. Green Co.). In some cases the refractory back-ups may be made from materials used for forming hard baked dry sand cores.

Reference is herewith made to the accompanying drawings which illustrate practice in accordance with the invention.

In the drawings:

Figure 1 is a somewhat diagrammatic view showing in cross section means for blowing a mixture of sand and resin into a cavity formed by a heated pattern and a member resting thereon and having portions spaced from the pattern.

Figure 2 is an elevational view showing a pattern and adhering layer of sand and resin and with a pressure member located above said pattern.

Figure 3 is a view similar to Figure 2 but with the layer of sand and resin compacted by the pressure member.

Figure 4 is a fragmentary perspective view of a formed shell forming one-half of a complete mold stripped from the pattern.

Figure 5 is a cross-sectional view of two of the half mold shells of Figure 4 supported by a reusable back-up contacting the back of the mold shells.

In the drawings, 10 is a pattern plate having a surface 11 adapted to conform with any desired shape; the particular shape shown being one-half of a cylinder. Any suitable heating means may be used for heating the pattern. In the apparatus shown an internal heating element 12 of the electric resistance type is provided for heating the pattern. A typical temperature is 500° F. Above the pattern plate is a member 14 having peripheral portions 16 resting on the pattern plate and having a cut-out portion 18 conforming generally to the shape of the pattern plate but spaced therefrom, thus forming with the pattern a generally closed cavity 19 for receiving sand and resin. Above the member 14 is a blow-head 20 containing a supply of sand-resin mixture indicated by 22. Openings 24 extend through member 14 from the blow-head to the mold cavity. A means 26 is provided for applying air pressure to the top of the supply of sand-resin mixture to force sand and resin through the openings 24 to completely fill the mold cavity formed by heated pattern plate 10 and member 14. In the form shown in Figure 1 the mold cavity is such that the shell of sand and resin is thicker at the portions 27 and 28 to give added strength at these portions. By means of heat applied to the pattern plate the resin in the sand-resin mixture in the mold cavity is fused and binds the sand grains together to form a partially cured relatively porous layer or shell adhering to the heated pattern. The pattern plate and partially cured layer or shell of sand and resin 29 adhering to the pattern are then removed and placed under a pressure means 30, having an accurately contoured surface 32 conforming generally to the shape of the back of the adhering layer of sand and resin. The dimensions of the pressure die may be such as to squeeze or press portions of the shell more than others. For example, it may be desirable in some cases to press the portion of the shell away from the portion forming the mold cavity more than the mold portion itself to give greater strength at such portions. Any suitable means 34 is provided for heating the pressure means. In the form illustrated the heating means is an electric resistance heater. The pressure head is lowered to contact and then press or squeeze the layer of sand-resin adhering to the heated pattern plate and reduce its thickness. By means of heat applied both to the pattern and pressure head the squeezed layer of sand and resin is rapidly cured. At a temperature of 500° F. a shell of 5/32" thickness is cured in about 15–20 seconds. The formed and cured shell 38 is then stripped from the pattern.

Two of the mold halves 38, either with or without gluing together, are placed between and with the mold parts nesting in the closely fitting refractory back-ups. Figure 5 shows the mold halves 38 in nesting relation forming a mold cavity 39 for receiving molten metal. The refractory back-up members are indicated at 40 and closely fit the contour of the back of the shell mold parts. The refractory back-up members are shown mounted in frames 42 and the frames and refractory material may be held or clamped together by mounting plates 44. Any other suitable means may be provided to hold the back-ups and shell mold halves. For example, one of the refractory back-ups may be mounted on a spring loaded plate with the other on a cross head movable by means of a piston in an air cylinder. The shell mold part and back-up carried by the cross head are movable to open and close the mold. The spring loading equalizes the pressure on the mold parts when the mold is closed.

Each of the refractory back-ups is separate from the shell mold part and is used in forming a multiplicity of castings, whereas each shell mold is destroyed in making a single casting.

In one typical example a resin coated sand of about 140 AFS number containing 3% phenol formaldehyde resin and one-half cc. of a Durez 15224 liquidizer per pound of coated core sand mix for improving the green strength was placed in a mold blowing machine. An electrically heated pattern (temperature 500° F.) was raised into the "blow" position, the pattern with adhering sand was retracted, and the partially cured shell on the pattern was placed in contact with an electrically heated press head (500° F.) for about 20° seconds during which time the shell was cured. The shell was then stripped from the pattern and assembled with a similarly formed shell and a previously formed core. The mold assembly was supported by a refractory back-up and six hundred pounds pressure was applied to hold the mold assembly in position and to support the back of the contoured shell. Cast iron was poured into the mold at 2600° F. Seventy-five castings were made using one set of back-ups and the back-ups still appeared in excellent condition.

In one series of tests, castings were made from molds clamped together but otherwise unsupported having shells 5/16" thick using silica sand and 3½% phenol formaldehyde resin. Cast iron was poured into the molds at 2650° F. The molds cracked and the metal "run out." When the resin content was increased to 4% and with the other conditions the same, about one-fourth the castings showed "run out" and the out of roundness of those which did not "run out" was on the order of .050" to .060". When the same casting was made using the back-up of this invention and 2½% resin coated sand, 5/32" shells did not break out and the maximum out of roundness observed on twelve castings was .027" including a .010" fin at the parting line. It will be noted that considerably less than half the amount of resin is employed in this illustration of practice in accordance with this invention as compared with the other procedures described in this paragraph.

While a most important feature of the invention is the use of extremely thin shells of low resin content, the back-up feature of this invention may be used also with shells of normal thickness and/or with resin contents heretofore employed.

While the embodiments of the invention specifically illustrated herein show the refractory-back contacting the entire back face of the shell mold, this may not be necessary in all cases. For example, in some instances the back-up face adjacent the shell mold may be slotted, or grooved, etc., to allow for escape of gases.

Various changes and modifications of the embodiments of our invention described herein may be made by those

We claim:

1. A method of shell molding which comprises forming a shell mold by contacting a heated pattern with a loose mixture of finely divided refractory oxides and thermosetting resin to fuse said resin and form a thin shell on said heated pattern, the percentage of resin ranging up to about 3½% by weight of the mixture, simultaneously applying heat and pressure to the back of said shell while it is on said heated metal pattern to form the back of the shell to a predetermined configuration and to compact and reduce the thickness of the shell by about 20 to 25% and to cure the same, said compacted shell having a thickness not over about 5/32", stripping the cured shell from said heated pattern, forming a second pattern conforming with the back of said cured shell, applying to the last mentioned pattern a slurry consisting of a refractory cement, refractory oxide and water, curing said slurry to form a dry, rigid back-up having a surface conforming to the back of a said shell to be supported thereby, supporting a said shell by said back-up during a metal casting operation and reusing said back-up to support other similarly shaped shells for forming a multiplicity of similar metal castings.

2. A method of shell molding which comprises forming a shell mold by contacting a heated pattern with a mixture of finely divided refractory oxides and thermosetting resin to fuse said resin and form a thin shell on said heated pattern, the percentage of resin ranging up to about 3½% by weight of the mixture, simultaneously applying heat and pressure to the back of said shell while it is on said heated metal pattern to form the back of the shell to a predetermined configuration and to compact and reduce the thickness of the shell by about 20 to 25% and to cure the same, said cured shell having a thickness of not over about 5/32", stripping the cured shell from said heated pattern, applying a water resistant coating to the back of one of said shells to thereby form a pattern for forming a back-up, applying to the last mentioned pattern a slurry consisting of a refractory cement, refractory oxide and water, curing said slurry to form a dry, rigid back-up having a surface conforming to the back of a said shell to be supported thereby, supporting a shell by said back-up during a metal casting operation and reusing said back-up to support other similarly shaped shells for forming a multiplicity of similar metal castings.

3. A method of shell molding which comprises forming a shell mold by contacting a heated pattern with a mixture of finely divided refractory oxides and thermosetting resin to fuse said resin and form a thin shell on said heated pattern, the percentage of resin ranging up to about 3½% by weight of the mixture, simultaneously applying heat and pressure to the back of said shell by a contoured press head while the shell is on said heated metal pattern to compact and reduce the thickness of the shell by about 20 to 25% and to cure the same, said cured shell having a thickness not over about 5/32", stripping the cured shell from said heated pattern, casting a material into the impression of the contoured press head, thereby forming a second pattern conforming with the back of a said shell, applying to the last mentioned pattern a slurry consisting of calcium aluminate, refractory oxide and water, curing said slurry to form a dry, rigid back-up having a surface conforming to the back of a said shell to be supported thereby, supporting said shell by said back-up during the metal casting operation and reusing said back-up to support other similarly shaped shells for forming a multiplicity of similar metal castings.

References Cited in the file of this patent

UNITED STATES PATENTS

| | | |
|---|---|---|
| 1,644,368 | Copeman | Oct. 4, 1927 |
| 2,660,770 | Davis | Dec. 1, 1953 |
| 2,682,692 | Kohl | July 6, 1954 |
| 2,691,196 | Banister | Oct. 12, 1954 |
| 2,705,822 | Vennerholm | Apr. 12, 1955 |
| 2,706,188 | Fitko et al. | Apr. 12, 1955 |
| 2,748,435 | Hackett | June 5, 1956 |

FOREIGN PATENTS

| | | |
|---|---|---|
| 700,763 | Great Britain | Dec. 9, 1953 |